May 31, 1932.  E. G. McCAULEY  1,860,510
FLUID PRESSURE CONTROL SYSTEM
Filed Jan. 31, 1928  4 Sheets-Sheet 1
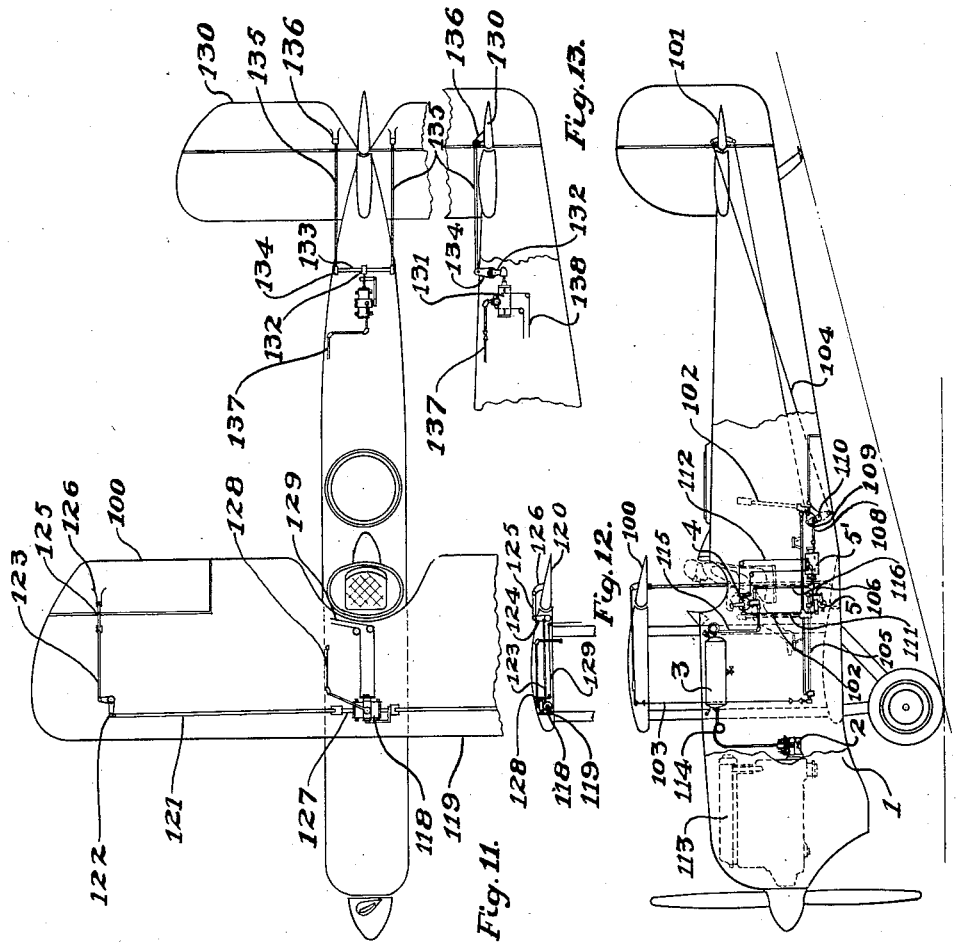
INVENTOR
BY Ernest G. McCauley
Robert A. Young
ATTORNEY May 31, 1932.   E. G. McCAULEY   1,860,510
FLUID PRESSURE CONTROL SYSTEM
Filed Jan. 31, 1928   4 Sheets-Sheet 2

INVENTOR
Ernest G. McCauley
BY
Robert A. Irving
ATTORNEY

May 31, 1932.                E. G. McCAULEY                1,860,510
                      FLUID PRESSURE CONTROL SYSTEM
                  Filed Jan. 31, 1928      4 Sheets-Sheet 3
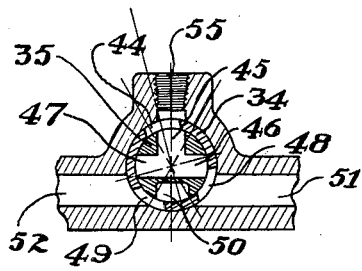
Fig. 6.
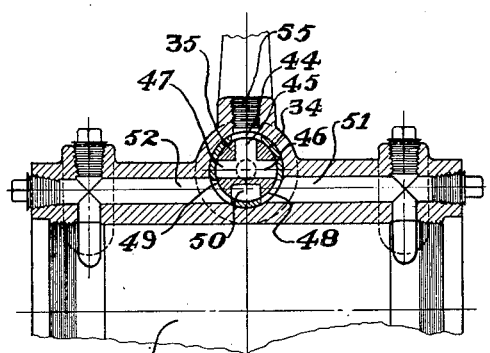
Fig. 5.
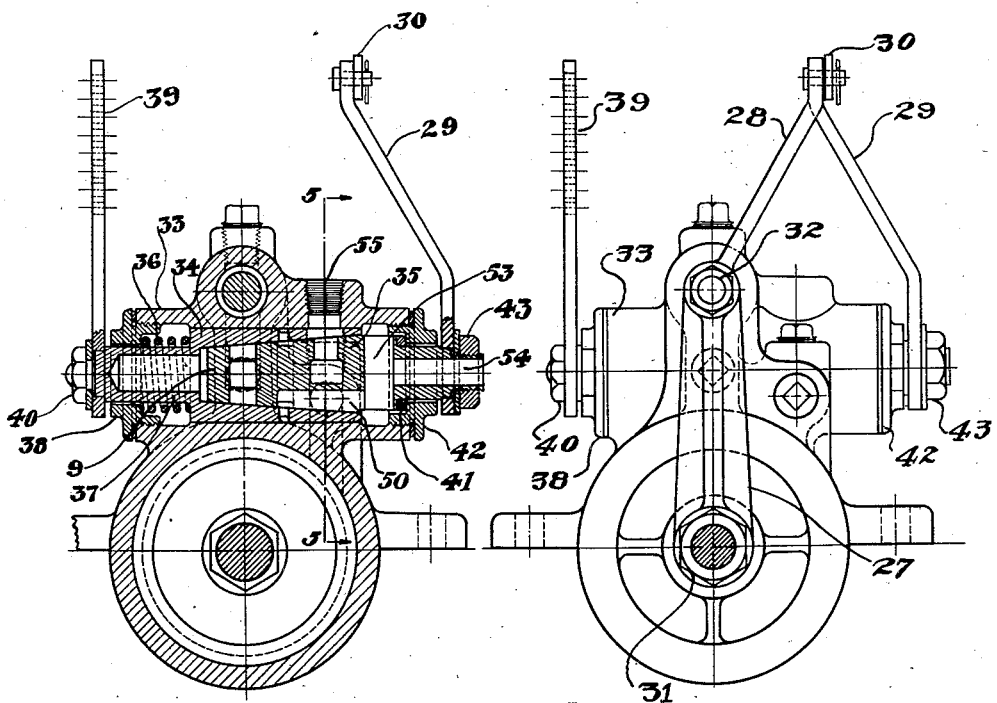
Fig. 3.                                  Fig. 4.
                                              INVENTOR
                                    BY  Ernest G. McCauley
                                        Robert H. Young
                                                ATTORNEY

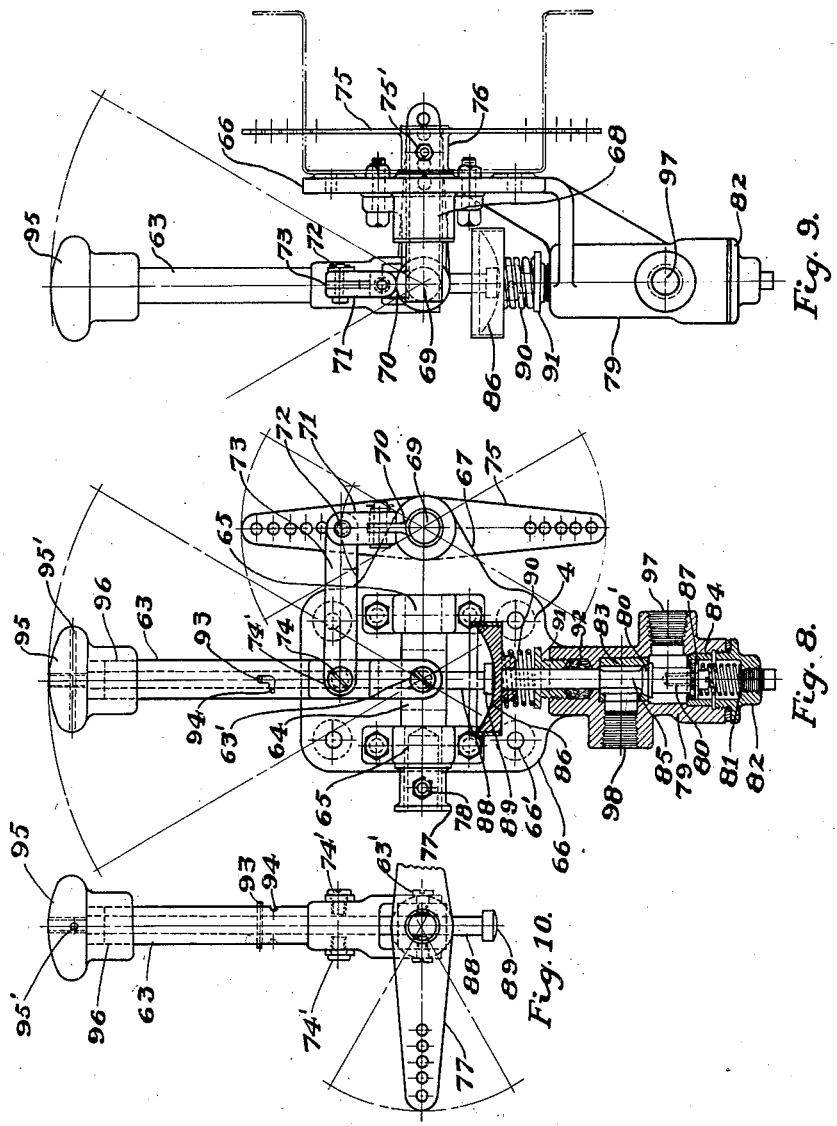

Patented May 31, 1932

1,860,510

UNITED STATES PATENT OFFICE

ERNEST G. McCAULEY, OF DAYTON, OHIO

FLUID PRESSURE CONTROL SYSTEM

Application filed January 31, 1928. Serial No. 250,919.

This invention relates generally to a fluid pressure operative mechanism.

The primary object of this invention is to operate a fluid pressure mechanism in synchronism with an operating device controlling the fluid pressure.

A further object of this invention is to provide in a fluid pressure mechanism, a movable part that will move in synchronism relation to an operating device, and whose movement is adjusted by the movement of said operating device, also the mechanism is provided with a locking means for holding said movable part in any adjusted position.

Another object of this invention is to provide means for causing a movable part in a fluid pressure operating mechanism to move in a synchronous relation to an operating device controlling the fluid pressure supply to said mechanism, and likewise causing the movable part to move proportionately in relation to the movement of said operating device. To this end I have provided a cylinder having a movable piston therein, being operable by a fluid pressure means controlled by an operating device consisting of an inner and outer rotary valve member connected to a control lever and piston respectively, whereby the fluid pressure is admitted to the cylinder to move the piston by moving the control lever, and then shut off upon a proportionate movement of the piston.

A further feature is the provision of an auxiliary or locking cylinder with a piston, that is held by a liquid, which is released simultaneously by the operating device, when the same is operated to cause the mechanism to function.

Another object is to provide a valve device having means for controlling the fluid pressure to an operated member and a liquid seal for permitting the movement of said member, simultaneous and in relation to each other.

A further object is to provide a manual control means to be transmitted into a fluid pressure means, the operation of the fluid pressure means being in a synchronous relation to the manual means.

Another object is to provide a valve device having an inner and outer rotary member whereby in one position of the members the fluid pressure is shut off, while the operation of one member will cause the fluid pressure to flow until the pressure is cut off by the other member.

Fig. 1 is a side elevation of an airplane with my invention incorporated therein.

Fig. 3 is a sectional view taken on the lines 3—3 of Fig. 2.

Fig. 4 is an end view of the control unit looking from the right of Fig. 2.

Fig. 5 is a part sectional view on the line 5—5 of Fig. 3.

Fig. 6 is a sectional view of the air control valve shown in Fig. 5 in open position.

Fig. 8 is a part sectional side elevation view of the hand control lever for the control unit shown in Fig. 2.

Fig. 9 is an end elevation of the view shown in Fig. 8.

Fig. 10 is a partial end elevational view looking from the left of Fig. 8.

Fig. 11 is a modification of my invention showing the control system directly connected to the control surface in the wing of the airplane.

Fig. 12 is an end view of a wing section showing a control unit connected to an aileron.

Fig. 13 is a side view showing control unit directly connected to the elevators.

Similar reference characters and numerals refer to similar parts throughout the several views of the drawings.

Figure 7:
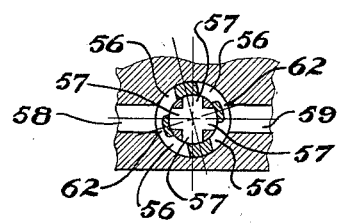
Fig. 7 is a sectional view of the liquid valve shown in Fig. 2 in open position.

This type of fluid pressure mechanism may be applied to operate various devices; for illustration I have shown it installed in an airplane to provide a power control for controlling the ailerons and elevators, while it can also be applied to operate the rudder, stabilizer, retractible landing gear, and for adjusting the pitch of an adjustable pitch propeller.

In the drawings referring to Fig. 1 the numeral 1 designates an airplane having my invention incorporated therein for purposes of operating and controlling the control surfaces. The fluid pressure system consists of an air compressor 2 for forming the fluid pressure source, connected to a storage tank 3, which in turn is connected to a controlling device 4 for operating the control units 5 and 5' which are connected to the ailerons 100 and elevators 101 respectively.

The control units 5 and 5' are identical in construction and therefore, it will suffice for purposes of clearness to describe but one of these.

Figure 2:
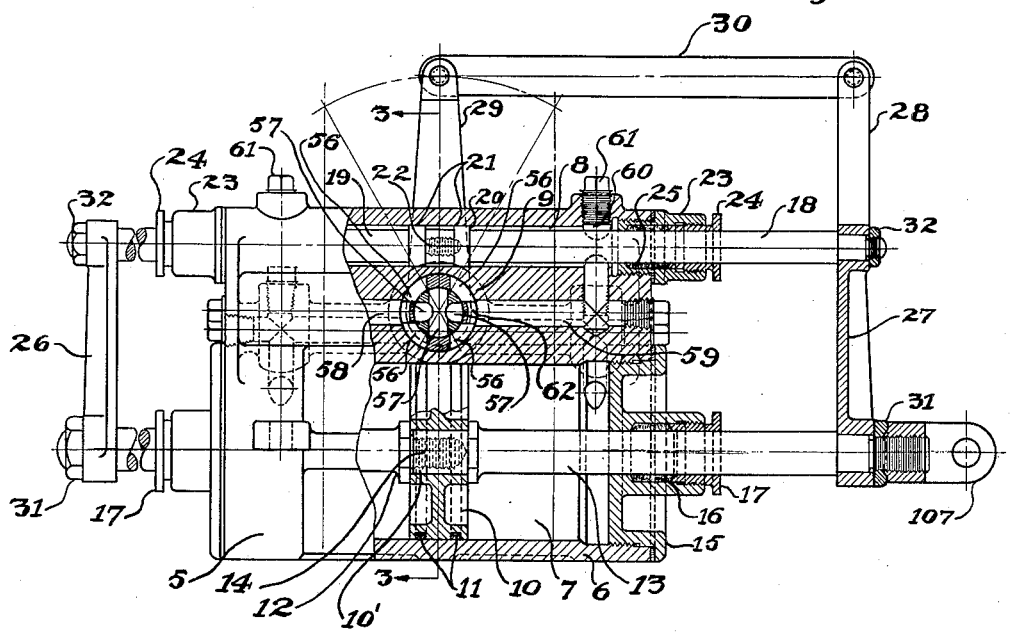
Fig. 2 is a side elevation with part section of the control unit for the control system.

The control unit 5 as shown in Fig. 2 consists of a casing 6 containing a working cylinder 7 and a locking cylinder 8, both cylinders being controlled by an operating device 9 to be hereinafter more fully described. The working cylinder 7 is provided with a piston 10 having piston rings 11 for the usual purpose of having the piston fit the cylinder closely and prevent leakage from one side to the other.

The piston 10 is provided with a central bore 10' to receive the tapped end of a connecting rod 13 as well as the threaded end of the connecting rod 12, said rods being in alignment and joined together by the threaded connection at 14.

Piston rods 12 and 13 extend through the cylinder heads 15 which are threaded into the casing 6 and provided with a packing 16 and gland nuts 17 for retaining the packing 16 around the piston rods 12 and 13.

The piston rod within the locking cylinder 8 is formed of two members 18 and 19 that are provided with shoulders 20 at their inner ends forming a piston 21 for cylinder 8, and are jointed together by threaded connection 22 similar to the connection 14.

Stuffing boxes 23 are provided at both ends of the cylinder 8, each of these stuffing boxes are externally threaded at one end to be connected to the casing 6 and internally threaded to receive a gland nut 24 for retaining the packing 25. The stuffing box 23 and gland nut 24 are provided with a bore through which the ends of the piston rod 18 and 19 pass. The piston rods 12 and 19 are connected by a yoke 26 at one end, and at the other end of rods 13 and 18 by a yoke 27. The yoke 27 at its upper end is provided with an extension 28 which is pivotally connected to a lever 29 by a link 30.

The yokes 26 and 27 are fixed to the piston 12, rods 13, 18 and 19 by means of nuts 31 and 32 respectively. As shown in Fig. 3 the casing 6 is provided with a cylindrical boss 33 at right angles to the working cylinder 7 and locking cylinder 8 and interposed between them to receive the operating device 9. The operating device 9 consists of an outer valve member 34 and inner valve member 35. The outer valve member 34 is rotatably mounted within the boss 33 and is held in place by means of a coil spring 36 seated about a reduced portion 37 of the valve 34 and retained in the pocket formed in a flanged nut 38. The reduced portion 37 is round and reduced at its end to form a square shoulder to receive a lever 39 which is fixed to the valve 34 by means of a nut 40.

The inner valve 35 is provided at its inner end with a tapered portion to form a tapered fit with the valve 34 and reduced at its outer end to receive a washer 41 that is retained in place and against the shoulder on valve 35 by means of a flanged nut 42. To the outer end of this valve 35 the lever 29 is fixed by means of a square shoulder and clamping nut 43.

As shown in Fig. 5, the outer valve member 34 is provided with an opening 44 that registers with an inlet opening 45 in the inner valve member 35. The opening 45 is at right angles too, and connected with opening 46 and 47 that permits the flow of fluid pressure when in an opened position through the openings 48 and 49 respectively. An exhaust opening 50 likewise registers with openings 48 and 49 to relieve the flow of fluid pressure as will be hereinafter described.

The inner and outer members as shown in Fig. 5 are in closed position and it will thus be seen that when the outer member is rotated as shown in Fig. 6, the opening 46 is uncovered to register with the opening 48 allowing the fluid pressure to enter through the opening 55 from the source of supply to a passage 51 that leads into the cylinder chamber 7, on one side of the piston 10. At the same time the fluid pressure on the opposite side of the piston is relieved by the exhaust port 50 on the inner valve member registering, with opening 49 and passage 52 leads from the cylinder 7. The exhaust opening 50 is formed by cutting a recess in the outer surface of the inner valve member 35 as shown in Fig. 3. The inner valve member is also provided with a hole 53 that connects the exhaust opening 50 to the atmosphere through opening 54. Likewise a reversal of movement imparted to the outer member will cause the fluid pressure to flow in the opposite direction and through opening 49 and passage 52 to the cylinder and the exhaust fluid pressure passing through the passage 51 and the opening 48 and exhaust port 50 as before described.

The valve members 34 and 35 are also provided with valve openings for controlling the flow of a liquid in the locking cylinder 8, and as shown in closed position in Fig. 2.

The inner and outer valve members are provided with additional openings that form a by-pass valve for the locking piston 21 in cylinder 8. The openings 56 of the outer member and openings 57 of the inner member register with the solid portions of the inner and outer valve member respectively when in closed position as shown in Fig. 2. When the outer valve member is rotated in a direction as shown in Fig. 7 the openings of both valve members register with each other and with the passages 58 and 59 that are interconnected and lead in opposite directions to the cylinder 8 to permit the flow of a liquid used as a sealing element in either direction, and permitting freedom of movement of the piston 21 in either direction depending upon the direction movement of the piston 10. The cylinder, passage ways 58, 59 and valve openings are filled with a liquid such as oil through the opening 60 in the casing 6 and hermetically sealed by plugs 61. The liquid is allowed to flow more freely by means of the double ported valve formed by recessing the opposite solid portions of the outer valve member at points as designated by the numeral 62.

The operating device 9 on the control unit 5 consisting of the inner and outer rotary valve member 34 and 35 functions in such a manner that when the lever arm on each valve member is parallel or in line with each other the operating device is closed as shown in Fig. 2 and Fig. 5 and no pressure is admitted to either side of the piston 10. In moving the lever arm 39 actuating the outer member 34, the port openings 46 and 48 on the inner member 35 will be uncovered as shown in Fig. 6 and Fig. 7 and the fluid pressure is then admitted at opening 55 to the cylinder 7, which will move the operating piston 10 in the same direction as the lever arm 39 on the outer member is moved. Likewise the port openings 56 and 57 controlling a liquid sealing the auxiliary or locking piston 21, are opened, and allows the liquid to by-pass from one side of the locking piston 21 to the other, when the working piston 10 is moving.

Since the lever arm 29 in the inner valve member 35 is connected to the working piston 10 by a link 30 and yoke 27; any movement of the piston 10 will in turn move the lever arm 29 on the inner valve member in the same direction as the piston 10 until both lever arms 29 and 30 are again parallel or in line. This likewise closes off the supply of fluid pressure to the cylinder 7 and the liquid in cylinder 8 that retards or locks the piston 21 from further movement and also holds the piston 10 which is connected to piston 21 at no matter what point of travel this may occur, depending entirely on the amount of movement of the lever arm 39 on the outer valve member 34.

This dual valve construction controlling the fluid pressure to the working cylinder and the liquid seal to the locking cylinder thus automatically performs two functions in simultaneous relation when actuating the valve members.

Thus any movement of the lever arm 39 on the outer valve member 34 permitting the fluid pressure to be admitted to the cylinder 7 will simultaneously cause a movement of the working piston which in turn through the yoke 27 and link connections 30 will move the lever arm 29 of the inner valve member 35 a proportionate amount and in synchronous relation to lever 39. It will thus be seen that movement of the working piston in either direction is proportionate and in synchronous relation with the valve members 34 and 35 comprising the operating device 9.

It will also be seen that a fluid pressure mechanism is provided that will operate a movable part in synchronous relation with an operating device and automatically lock or release the part thus operated as desired.

A control lever unit 4 shown in Figs. 8, 9 and 10 for operating the operating device 9 on the control unit 5 comprises a universal swiveling lever 63 and a control valve 80 operated by said swiveling lever.

Where two control units are operated by a single control lever as will be hereinafter described, a universal swiveling action is necessary whereby the control lever 63 may be moved forward or backward from a vertical normal position likewise sidewise in either direction, or any possible combination thereof.

The control lever 63 is pivoted by shoulder screws 63' at its lower end to a shaft member 64 mounted in bearings 65 on a bracket 66. This bracket is provided with openings 66' to receive bolts and nuts for purposes of mounting. This bracket is further provided with an extension 67 having a boss 68 to form a bearing for a secondary shaft 69. Integrally formed on end of the shaft 69 is a lug 70 which is pivotally connected to a universal clevis 71 which in turn is pivotally connected by clevis pins 72 to a link 73 that is pivotally attached to the control lever 63 at point 74 on same by shoulder screws 74'. At the opposite end of the shaft 69 is mounted a lever 75 and rigidly fixed thereto by a bolt and nut connection 75' passing through the bearing portion 76 of the lever 75 and the shaft 69.

Mounted at the outer end of the shaft 64 is a lever arm 77 that is connected rigidly to the shaft 64 by bolt and nut connection 68. It will now be apparent that in moving the control lever 63 forward or backward from a normal position as shown in Fig. 8; the lever arm 75 is simultaneously rotated in the bearing 68 through link 73, universal clevis 71 and shaft 69. Also in moving the control lever laterally in either direction will cause a rocking of the shaft 64 and a corresponding movement of the lever arm 77. With this construction any movement of the control lever 63 in a direction other than backward or forward, or in a lateral direction at right angles to the backward and forward movement will effect both the levers 75 and 77, thus providing a control lever having a universal swiveling action to actuate the levers separately or together.

A valve body 79 made integral with the bracket 66 and positioned directly beneath the control lever 63 is provided with a bore to receive a balanced valve 80 that is retained in yielding position at the lower end of the body by means of a coil spring 81 and flange nut 82. The valve 80 has a tapered seat 80' that bears against a bushing 83 and is balanced by providing at its lower end a piston member 87 that slides in bushing 84. Extending upwardly beyond the tapered seat 80' is the valve stem 85 and slidably attached thereon is a spherical seat member 86.

Passing through the control lever 63 is a rod 88 provided at its lower end with a spherical collar 89 that is frictionally held against the seat by means of a coil spring 90 mounted between the seat member 86 and a bushing 91 that is threaded into the valve body 79 for retaining the packing 92 about the valve stem 85.

The rod 88 is slidably mounted within the lever 63 and is retained in position by means of a pin 93 fixed to the rod 88. Said pin is received within an L-shaped slot 94 formed in the control lever 63. Threaded on to the upper end of the rod 88 is a knob 95 and held by pin 95' which forms a handle for the control lever 63. The knob is provided with a bored portion 96 to loosely receive the upper end of the control lever 63 and is of sufficient depth to permit a downward as well as rotary movement of the rod 88. By pressing on the knob 95 and rotating the same a quarter turn the rod will be latched in its downward position by means of the pin 93 in the lower end of slot 94. It will thus be seen that regardless of the position of the control lever 63 the spherical collar 89 will constantly and frictionally engage the seat member 86 likewise any downward pressure on the knob will force the valve 80 down and away from the seat 80' on the bushing 83 thereby opening valve to permit the fluid pressure to enter the opening 97 at the lower side of the valve seat and pass through the opening 98 at the upper side of the valve seat, and balancing the valve 80 by the pressure against the piston member 87.

In Fig. 1 all the foregoing mechanism as formerly described is shown installed in an airplane 1 as a supplementary control to the regular manual control installation, for operating and controlling the control surfaces which consists of ailerons 100 and elevators 101.

The ailerons 100 and elevators 101 are connected to the manual control sticks 102 through cables 103 and 104 respectively in the usual and well-known manner.

The fluid pressure control unit 5 for the ailerons is suitably mounted within the fuselage and is attached to the usual shaft 105 by means of a lever arm 106 having a slotted connection with the clevis 107 best shown in Fig. 2.

The control unit 5' is likewise suitably mounted within the fuselage and is pivotally connected by the clevis 107 through a link 108 to a lever arm 109 that is fixed to the usual cross shaft 110 for controlling the elevators 101.

The control lever unit 4 is suitably mounted within the cockpit of the fuselage within accessible reach of the pilot and is connected to the operating device 9 of control units 5 and 5' by means of cables 111 and 112 respectively.

A source of fluid pressure supply, compressed air being preferred is provided by a compressor pump 2 driven by the motor 113. The fluid pressure supply is forced into a storage tank 3 having the usual pressure gauge and safety valve through a pipe line 114 connected to the compression pump 2 and tank 3. An outlet pipe 115 from the tank is connected to the valve body 79 at the opening 97 of the control lever unit 4, which is further connected to the control units 5 and 5' by means of the fluid pressure pipe 116. This pipe 116 is threaded into the opening 98 on the valve body 79 of the control lever unit 4 and likewise connected to the openings 55 of the fluid pressure control units 5 and 5'.

In the operation of the fluid pressure mechanism for controlling the ailerons and elevators it will be necessary for the pilot to move the control lever 63 in the same manner as he would move the manual stick 102 for controlling the airplane. Since the fluid pressure that leads into the control units 5 and 5' from the storage tank 3 is controlled by the control lever 63 it will be seen that it is necessary to depress the knob 95 and rod 88, on the control lever 63 and retain same in a downward position by means of the slot 94 and pin 93 if desired to connect the fluid pressure from the source of supply to the control units. Assuming that the pilot is desirous of lowering the elevator to raise the tail of the airplane, he merely moves the control lever 63 forward from its vertical normal position, which in so doing the cable 112 connected to the lever 75 and valve lever 39, is caused to open the operating device 9 on control unit 5' to permit the fluid pressure to flow through the ports 45, 46 and 48 and passage 51 into the working cylinder 7 whereby the piston 10 and connecting link 108 is actuated to go forward in a direction towards the front of the plane thereby rotating crossshaft 110 and through the cable connections 104 move the elevator 101 in a downward direction as desired, since the ports 56 and 57 register at the same time that the openings 46 and 48 register and thereby permit the liquid seal to open and the liquid to circulate through the valve members from one side of the locking cylinder 8 to the other depending upon the direction of movement of the piston 21. Now then, assuming that the control lever 63 is moved forward and held in that position the elevator will be moved a proportionate amount and be held in a corresponding position due to the fact that as the working piston 10 is moved forward to place the elevator in a corresponding position to the control lever 63, it simultaneously moves the yoke 27 and link 30 attached to lever 29 that closes the operating device thereby shutting off the supply of fluid pressure to the piston 10 and likewise the flow of liquid on piston 21, thus locking the piston 21 as well as piston 10 from further movement.

The ailerons 100 connected to the control unit 5 operate in the same manner as the elevators. The control unit 5, however, being connected to the control lever 63 by cable 111, is operated when the movement of the control lever 63 is in a lateral direction and effects the lever 77 to which the cable 111 is connected. It will thus be seen that the control surfaces of the airplane may be controlled independently or in combination with each other to an extent proportionate to the movement of the control lever 63 and that their movements are synchronized through the operating device on the control unit.

A further improvement is thus provided over the conventional manual stick control system, whereby the control lever may be moved to any position which in turn will move the control surfaces, and then hold same by locking the control surfaces in any desired position.

Figs. 11, 12 and 13 show a modification of the method of installation, whereby the control units are directly connected to the control surfaces. In Fig. 12 the control unit 118 is positioned within the wing structure 119 and is connected by means of the piston rod 127 to the aileron 120 through a longitudinal rod 121, bell-crank 112 pivoted thereto and rod 123 connected to bell-crank 122 and a lever arm 124, of which a portion extending through the upper surface of the wing is pivotally attached to a rod 125 that is connected to a mast 126 on the aileron. The lever 124 at its lower end is pivoted and held mounted in any suitable manner, and at its mid-portion is pivotally connected to the rod 123.

The piston rod 127 extends through the unit 118 and is connected in a similar manner at its opposite end to the aileron on the opposite wing (not shown).

The fluid pressure supply is admitted to the control unit 118 by a supply pipe 128 and the cables 129 are connected to the valve device and a control lever unit (not shown). The control unit is operated as heretofore described.

The elevators 130 in Fig. 13 are operated through the control unit 131 which is directly connected thereto by means of lever arm 132 fixed on a shaft 133 corresponding to shaft 110. The shaft 133 is provided at opposite ends with levers 134 that are pivotally connected to rods 135 attached to the masts 136 on the elevators. Connections leading from the control unit to the control lever is made by fluid pressure line 137 and cable 138.

In the practical application of the invention thus set forth, various devices as well as various applications of my invention may be employed in substitution for those which are herein shown as illustrating the principles involved; and variations may be made in many respects without departing from the scope of the invention. It is intended that the patent shall cover by suitable expression in the appended claims whatever features of patentable novelty exist in the invention disclosed.

I claim:

1. In a control system, a source of fluid pressure supply, a member having a movable part, a device to control said fluid pressure, means for actuating said device so constructed and arranged that said movable part is simultaneously operated by said fluid pressure in synchronous relation to said device and separate means for positively and automatically locking said movable part upon cessation of said device.

2. In a control system, a source of fluid pressure supply, a member having a movable part, a manual control means, a device to control said fluid pressure so constructed and arranged that said manual means in actuating said device simultaneously operates said movable part in synchronous relation to said manual means, and further means for positively locking said movable part in a predetermined relation to said manual control means.

3. In a control system, a source of fluid pressure supply, a member having a movable part, means for controlling said fluid pressure, means inter-connecting said movable part and controlling means and being so constructed and arranged that said movable part and controlling means are operated in synchronous relation, and separate means for positively and automatically locking said movable part in relation to said control means.

4. In a control system, a source of fluid pressure supply, a member having a movable part, a manual control means, a device to control said fluid pressure so constructed and arranged that said manual means in actuating said device simultaneously operates said movable part in synchronous relation to said manual means, and means for automatically locking said movable part upon cessation of the actuation of said part in relation to said manual means.

5. In a control system, a source of fluid pressure supply, a member having a movable part, a manual control means, a device to control said fluid pressure so constructed and arranged that said manual means in actuating said device simultaneously operates said movable part in synchronous relation to said manual means, and means for automatically locking said movable part upon cessation of the actuation of said part in relation to said manual means, and likewise automatically releasing said movable part upon further movement of said manual means.

6. In a fluid pressure operated mechanism, a member having a movable part therein, an operating member, fluid pressure means for moving said part in synchronous relation to said operating member, and separate means for automatically locking said part in relation to said operating member upon cessation of said moving part in relation to said manual means.

7. In a fluid pressure operated mechanism, a member having a movable part therein and a control valve, fluid pressure means for moving said part in synchronous relation to said valve, and means so constructed and arranged that said valve will hold said part in predetermined relation therewith.

8. In a fluid pressure mechanism, a member having a movable part therein and a control valve for controlling the fluid pressure and a separate liquid controlled locking device, means for opening the control valve to move said part, and separate means actuated by said moving part to close the control valve and positively lock said moving part after a predetermined movement of said first mentioned means.

9. In an aircraft, members for controlling said aircraft and a fluid pressure system, means for operating said members by said fluid pressure system in synchronous relation to a manually operated device, and further means for automatically and positively holding said members when moved to the extent determined by said manually operated device.

10. In a control system, a part to be operated, a cylinder, a member therein and connected to said part, a source of fluid pressure supply, a valve device to admit fluid from said source to either end of said cylinder, said valve device selectively operating the piston in either direction and means so constructed and arranged that a predetermined movement of said valve will simultaneously move said part a correspondingly proportionate amount and further means to automatically lock said part in any adjusted position.

11. In a fluid control system, a part to be operated, a cylinder, a working piston therein connected with said part and movable in said cylinder, a source of fluid pressure supply, an auxiliary cylinder having a piston therein, and a sealing liquid, said auxiliary piston being connected to said working piston, a manually controlled valve controlling the influx of fluid pressure to said working cylinder and the escape of fluid pressure therefrom, and likewise controlling the flow of said sealing liquid from one side of the auxiliary piston to the other.

12. In a fluid control system, a part to be operated, a cylinder, a working piston therein connected with said part and movable in said cylinder, a source of fluid pressure supply, an auxiliary cylinder having a piston therein, and a sealing liquid, said auxiliary piston being connected to said working piston, a manually controlled valve controlling the influx of fluid pressure to said working cylinder and the escape of fluid pressure therefrom, and likewise controlling the flow of said sealing liquid from one side of the auxiliary piston to the other, said valve device so arranged when opened to permit the liquid to by-pass from one side of the auxiliary piston thru the valve to the opposite side and when closed to trap the liquid on both sides of the auxiliary piston serving to lock said auxiliary piston when the fluid pressure is cut off.

13. In a fluid control system, a part to be operated, a cylinder, a working piston therein connected with said part and movable in said cylinder, a source of fluid pressure supply, an auxiliary cylinder having a piston therein, and a sealing liquid, said auxiliary piston being connected to said working piston, a manually controlled valve controlling the influx of fluid pressure to said working cylinder and the escape of fluid pressure therefrom and likewise controlling the flow of said sealing liquid from one side of the auxiliary piston to the other, said valve device so arranged when opened to permit the liquid to by-pass from one side of the auxiliary piston thru the valve to the opposite side and when closed to trap the liquid on both sides of the auxiliary piston serving to lock said auxiliary and working pistons in any adjusted position when the fluid pressure is cut off.

In testimony whereof I affix my signature.

ERNEST G. McCAULEY.